(12) United States Patent
De Marchi

(10) Patent No.: US 6,179,477 B1
(45) Date of Patent: Jan. 30, 2001

(54) SLEEVE PART FOR A PLUG CONNECTION FOR FIBRE OPTICS, AND A PLUG CONNECTION

(75) Inventor: Silverio De Marchi, Ascona (CH)

(73) Assignee: Diamond SA, Losone (CH)

(*) Notice: Under 35 U.S.C. 154(b), the term of this patent shall be extended for 0 days.

(21) Appl. No.: 09/359,424

(22) Filed: Jul. 23, 1999

(30) Foreign Application Priority Data

Aug. 21, 1998 (EP) .................................................. 98810823

(51) Int. Cl.[7] ........................................................ G02B 6/38
(52) U.S. Cl. .............................. 385/56; 385/75; 385/77; 439/680
(58) Field of Search ................................ 385/56, 53, 54, 385/55, 70, 135, 75–83; 439/578, 680, 839, 879

(56) References Cited

U.S. PATENT DOCUMENTS 5,420,951 * 5/1995 Marazzi et al. ...................... 385/75
5,675,682 * 10/1997 De Marchi ............................ 385/77

FOREIGN PATENT DOCUMENTS

0616236 A1   11/1993  (EP) .

OTHER PUBLICATIONS

International Search Report EP 98810823 Jan. 19, 1999.

* cited by examiner

Primary Examiner—Phan T. H. Palmer
(74) Attorney, Agent, or Firm—Shoemaker and Mattare, LTD

(57) ABSTRACT

A sleeve part (1) for a plug connection for fiber optics is provided with an opening (2) for accommodating a plug part (21). The plug part (21) is insertable in the direction of an insertion axis (A) into the sleeve part (1). The sleeve part comprises a sleeve (3) for receiving a plug pin of the plug part (21). The sleeve part (1) is furthermore provided with a securing element (4) with a coding consisting of projections (5) and/or reliefs (6). The securement section (4) is arranged on at least one separately formed coding element (7, 7'). The coding element (7, 7') in a snap-on direction (R) roughly perpendicular to the insertion axis (A) can be snapped on the sleeve part (3).

12 Claims, 4 Drawing Sheets

SLEEVE PART FOR A PLUG CONNECTION FOR FIBRE OPTICS, AND A PLUG CONNECTION

BACKGROUND OF THE INVENTION

The invention relates to a sleeve part for a plug connection for fibre optics and such a plug connection, with the features of the preamble of the independent patent claims.

Such sleeve parts are known in a multitude of various embodiment forms for connecting fibre optics which are provided with a plug part.

It is known to provide such sleeve parts and plug parts with codings so that it is ensured that only an exactly defined plug part may be inserted into a certain sleeve part.

From the European Patent EP 616 236 it is for example known on a plug part to provide a key section with a coding consisting of projections and reliefs. The key section may engage into a securement section on the sleeve part with a corresponding coding. The key section and the securement section are arranged such that a detent pawl in the sleeve part may only be latched in with a coding which agrees. With this it may be prevented that on an apparatus by mistake the wrong plug parts are inserted.

Since the releasing lever may be a separate component, releasing levers with a different coding may easily be manufactured, which selectively may be assembled onto plug parts. Also the securement section on the sleeve part is formed exchangeable. With this the securement section is formed on a frame which simultaneously holds together several individual components of the sleeve part.

Although this type of coding is reliable, however with regard to the manufacture and the handling it has certain disadvantages. The frame must be snapped onto the sleeve part in a pivoting movement. This combination of tilting and snapping in is relatively complicated and makes the manufacturing procedure more difficult.

It is aimed at exchanging the coding elements as simply as possible. The sleeve parts should be able to be manufactured uniformly with the injection moulding method and subsequently provided with suitable codings. With codings according to the state of the art the exchange is not so simple since the sleeve part simultaneously is held together by the frame. With an exchange of the coding element there exists the danger that the individual parts of the sleeve part displace with respect to one another.

The frame with the coding according to the state of the art may furthermore not be exchanged with an inserted plug part. With certain applications it is however advantageous if the coding is able to be changed also when the plug part is inserted into the sleeve part. For example thus by differing colours on the coding, certain plug connections may be marked. It is also conceivable that on operation the end of the fibre optic lying opposite the plug connection may be connected onto another peripheral apparatus so that the type of coding changes. With this it is disadvantageous when the plug connection must first be interrupted so that a new coding may be placed on.

A further disadvantage of the coding known from the state of the art lies in the complicated assembly and in the relatively large material consumption for the coding frame.

It is therefore the object of the present invention to avoid the disadvantages of that which is known, in particular thus to provide a sleeve part and a plug part which are able to be manufactured economically, which may be simply assembled and which permit an exchange of the coding elements on the sleeve part and on the plug part even with a plug part inserted into the sleeve part.

SUMMARY OF THE INVENTION

According to the invention these objects are achieved with a sleeve part and with a plug connection with the features of the characterising part of the independent patent claims.

The sleeve part for the plug connection for fibre optics consists essentially of a housing. The housing comprises at least one opening for the accommodation of a plug part. If the sleeve part is used as a coupling element for two plug parts the housing of course comprises two openings lying opposite one another. The plug part is at least partly insertable into the sleeve part along an insertion axis. The sleeve part comprises as usual a sleeve for the accommodation of a plug pin on the plug part. For ensuring that only a suitable plug part may be inserted into a certain sleeve part the sleeve part is provided with a securement section. The securement section comprises a coding consisting of projections and/or reliefs. A key section of a plug part with a corresponding coding, may be brought into engagement with the coding. If a key part with a wrong coding is attempted to be inserted then the codings do not correspond to one another and the insertion of the plug part into the sleeve part or a latching-in is made impossible.

According to the features of the invention the securement section of the sleeve part is arranged on at least one separately formed coding element. The coding element can be snapped onto the sleeve part in a snap-on direction which runs transversely to the insertion axis. This means that the coding element from one side (for example from above) may be snapped onto the sleeve part and does not as up to now consist of a frame which may be deposited onto the sleeve part with a snap-rotating movement. Transversely is to be understood as snap-on directions which do not run parallel to the insertion axis, A combined pivoting-snap movement is also conceivable.

Because the snap-on direction runs roughly perpendicular to the insertion axis the coding element may also be snapped on when the plug part is inserted.

If, given an inserted plug part, the coding element is to be exchanged this may be simply snapped away. Thus the coding element on the plug part, which lies under the coding element of the sleeve part, is freed. In this manner also the key section on the plug part may be exchanged.

The sleeve part is advantageously provided with at least one protective flap for closing the opening. Such protective flaps are known per se and are applied for preventing contamination of the sleeve part. The protective flap is pivotably mounted on an axis in the sleeve part.

In a first embodiment example of the present invention t he coding element is formed roughly U-shaped. The coding element with the limbs may be snapped onto the lateral walls of the sleeve part. U-shaped is to be understood here as a coding element with a cross section which has a roughly flat base and two limbs standing roughly perpendicular thereto.

Advantageously the coding element simultaneously forms a part of the outer surface of the sleeve part. Thus the outer surfaces in each case of one of the limbs may lie in the same plane as one of the outer surfaces of the lateral walls of the sleeve part. The coding element fits into the entirety of the sleeve part and is distinguished from this at the most by a differing colour.

In a second embodiment example the coding element may be formed as an essentially flat platelet. The platelet can be snapped onto the axis by way of at least one snap element, for example a projection comprising a relief with an undercut, the axis also carrying the protective flap. Because the axis simultaneously carries the protective flap and the coding element on the one hand material can be saved and on the other hand the constructional manner of the sleeve part may be selected more compactly.

Basically it is conceivable to provide the sleeve part with one or more sleeves for accommodating one or more plug parts lying next to one another. In a preferred embodiment example the sleeve part is formed as a so-called duplex part, which comprises two sleeves for accommodating two plug pins lying next to one another. On the axis there are arranged two protective flaps lying next to one another. The projection of the platelet is arranged on the platelet in a middle section and may be snapped onto the axis between the two protective flaps.

Advantageously the coding element on one side comprises an essentially flat surface. The flat surface with a snapped-on coding element lies roughly in the same plane as the upper side of the sleeve part. By way of this there results a particularly compact construction, For the improved positioning and insertion of the coding element this may furthermore be provided with aligning elements which ensure an exactly defined snapping-on. The aligning elements may be brought into engagement with corresponding elements on the sleeve part. Advantageously simultaneously at least one part of the aligning elements serves also as projections and/or deepenings for the coding. The projections which a rearranged on the one side of the coding element thus serve the guiding of the coding element with the snapping-on procedure and simultaneously act as projections for the coding.

The sleeve part may be particularly simply manufactured with the injection moulding method. The coding element too may be manufactured with the injection moulding method. The sleeve part may by way of this be constructed in few steps. After the manufacture of the sleeve part one or several coding elements may be snapped on.

The previously described various embodiment forms of sleeve parts may be particularly advantageously applied in a plug connection for fibre optics in which a plug part with a key section with a coding of reliefs and/or projections may be applied into the sleeve part. So that the plug part latches in the sleeve part, the sleeve part may be provided with a detent pawl. The plug part comprises a blocking element and may be provided with a releasing element. Such an arrangement is known from the state of the art. Advantageously the key section which defines the coding on the plug part is arranged on the releasing element. Such a plug part is described in EP 616 236.

With this advantageously the releasing element is exchangeably held in the plug part. Whereas on account of the frame according to the state of the art neither the key section on the plug part nor the securement section on the sleeve part may be exchanged with the plug part inserted, with the plug connection part according to the present invention it is possible firstly to snap off the coding element of the sleeve part and then to release the freed releasing element from the plug part.

This permits the replacement of coding elements with coding elements with the same code but a different colour or also with coding elements with a different code when the plug part is inserted.

BRIEF DESCRIPTION OF THE DRAWINGS

The invention is hereinafter described in more detail by way of the drawings and in embodiment examples. There are shown.

DESCRIPTION OF THE PREFERRED EMBODIMENTS

Figure 1:
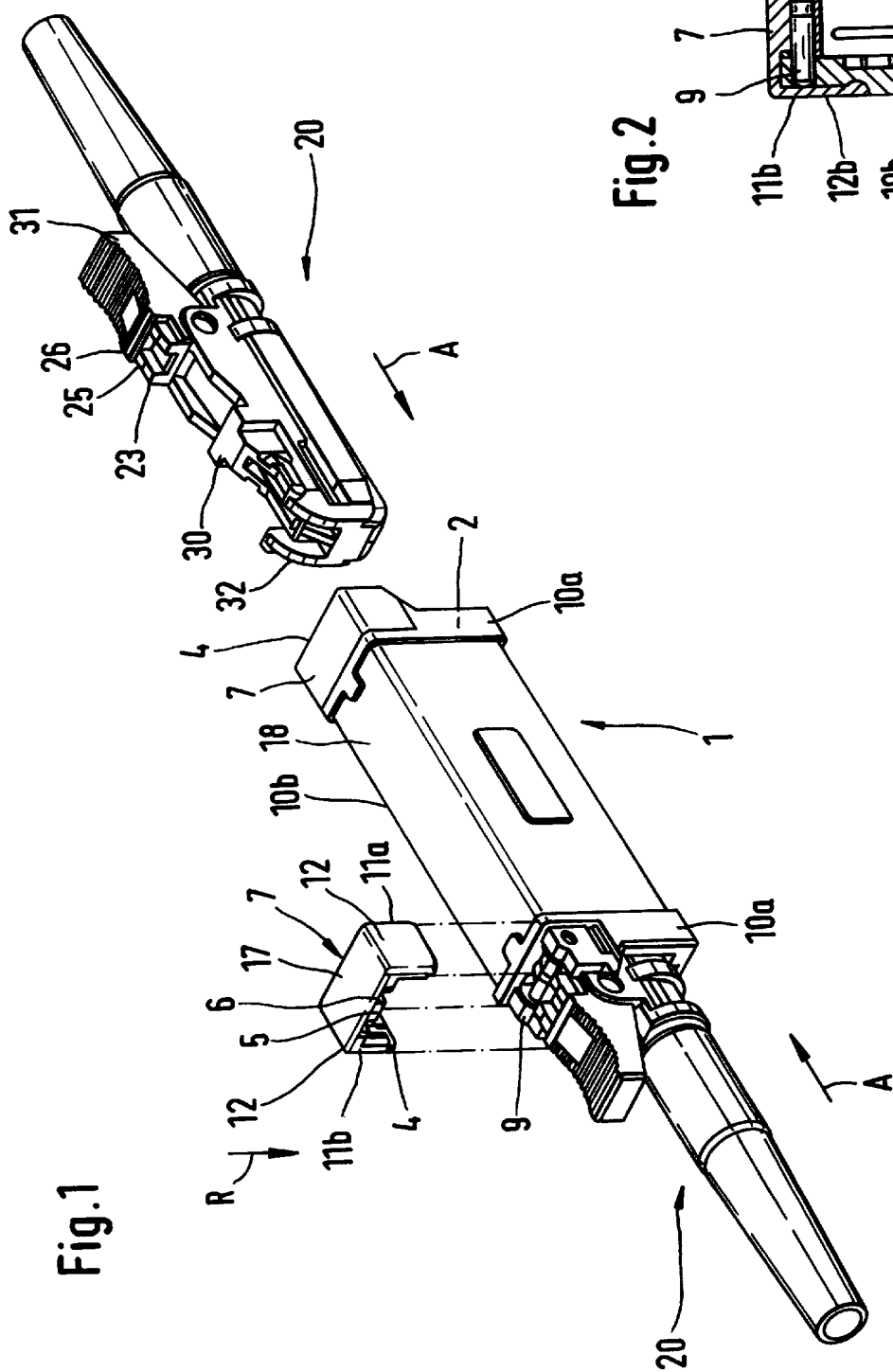
FIG. 1 a perspective representation of a first embodiment example of a plug connection according to the invention, FIG. 2 a cross section through the sleeve part according to FIG. 1, FIG. 3 perspective representation of the sleeve part from FIG. 1 with a snapped-off coding element.

FIG. 1 shows a plug connection with a sleeve part 1 and two plug parts 20. The plug parts 20 are insertable on in each case one side of the sleeve part 1 into an opening 2 on the sleeve part 1 along an insertion axis A. The plug parts 20 are essentially known.

The plug parts 20 comprise a plug pin which is covered by a flap 32. The flap 32 on insertion of the plug part 20 is opened so that the plug pin is freed.

The plug part 20 is provided with a locking mechanism. The locking mechanism consists essentially of a blocking element 31 which can be latched behind a detent pawl in the sleeve part 1, and of a releasing element 31 by way of which the detent pawl in the sleeve part 1 is lifted and can be brought out of engagement with the blocking element 30. Formed as one piece with the releasing element 31 is a key section 23 which codes the type of the plug part 20. The key section 23 consists of a number of projections 25 and reliefs 26 arranged in a predetermined sequence.

The sleeve part 1 is essentially formed as one piece and comprises roughly a rectangular cross section. The sleeve part has two lateral walls 10a, 10b and an upper side 18.

A coding element 7 in a snap-on direction R can be snapped onto the sleeve 1 part roughly perpendicular to the insertion axis A. The coding element 7 carries a securement section 4 which codes the type of the sleeve part 1. The securement section 4 consists of projections 5 and reliefs 6.

The coding element 7 is formed U-shaped and comprises two limbs 11a, 11b. The outer surfaces 12 of the limbs 11a, 11b lie roughly in the same plane as the lateral surfaces 10a, 10b of the sleeve part 1.

The coding element 7 comprises an essentially flat surface 17 which ties roughly in the same plane as the surface 18 of the sleeve part 1.

The coding element 7, also given an inserted plug part 20 can be snapped onto the sleeve part 1.

Figure 2:
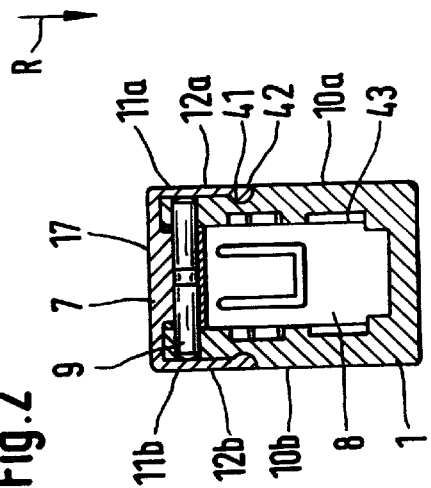

In FIG. 2 there is shown a cross section through the sleeve part 1 with a snapped-on coding element 7. The U-shaped coding element 7 with a cam 41 latches into a groove 42 on the outer side 10a, 10b of the sleeve part 1.

FIG. 2 furthermore shows a protective flap 8 which is rotatably mounted on an axis 9. The protective flap 8 occludes the inner space of the sleeve part and the opening 2 and in this manner avoids contamination.

Figure 3:
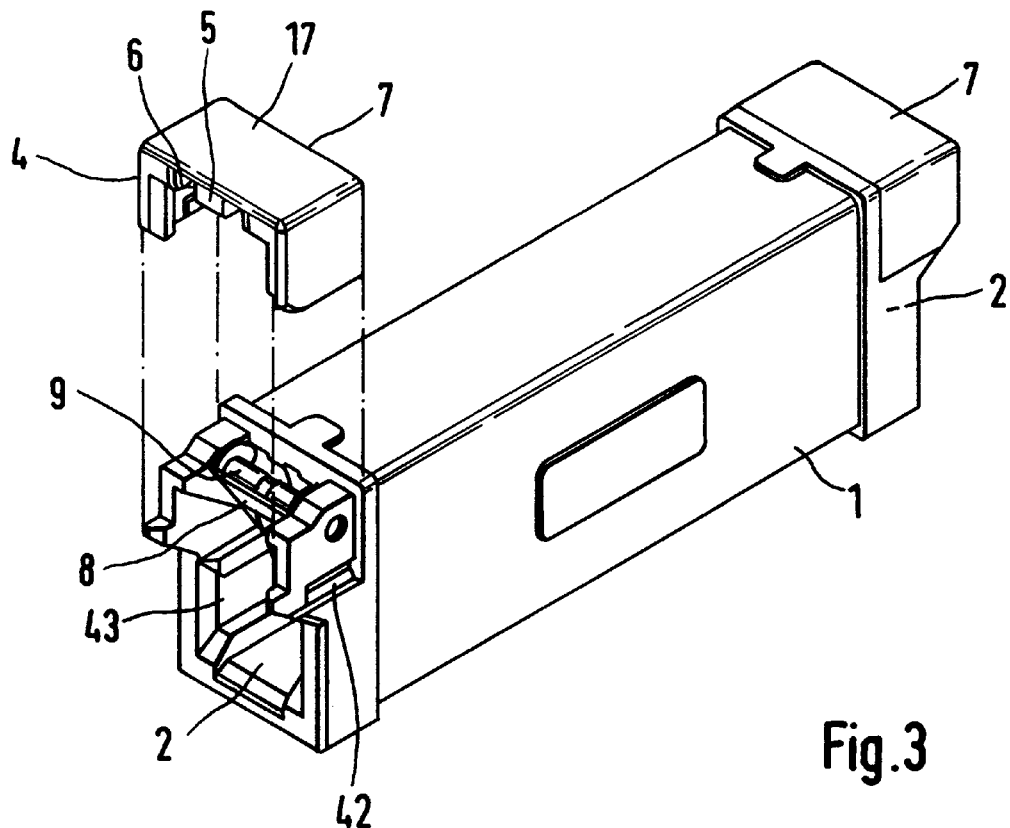

FIG. 3 shows the sleeve part 1 in an enlarged representation. The sleeve part 1 on two sides comprises openings 2 into which a plug part can be inserted. The sleeve part is provided with guiding lines 43 which permit an exactly defined insertion of the plug part. As is evident from FIG. 3 the securement section 4 is provided with projections 5 and reliefs 6 which can be brought into engagement with the projections 25 and reliefs 26 shown on the plug part 20 in FIG. 1, of the key section 23.

Figure 4A:
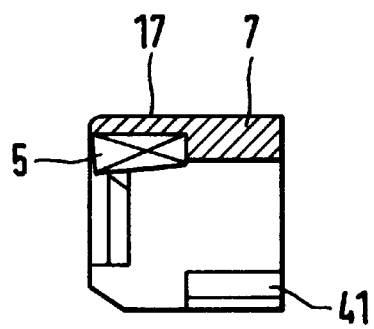
FIG. 4a and 4b detailed views of the coding element of FIG. 3.

FIG. 4a shows a cross section through the coding element 7 along, the insertion axis A.

Figure 4B:
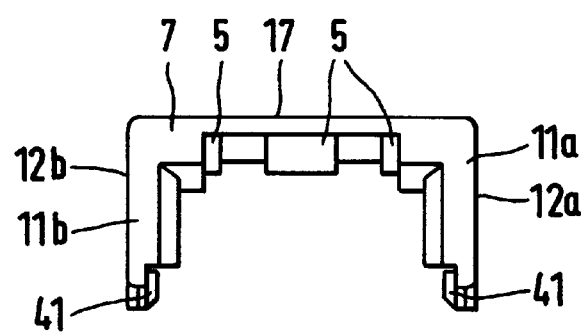

FIG. 4b shows a lateral view of the coding element 7. With the cams 41 slightly bevelled on their lower side the coding element 7 snaps into the groove 42 on the sleeve part 1.

If the plug part according to FIG. 1 with a key section 23 with a certain coding is inserted into a wrong sleeve part 1a the projections 5 and reliefs 6 of the coding element may not be brought into engagement with the reliefs 26 and projections 25 of the securement sections 23. The plug part 20 may therefore not correctly latch in.

Since the coding element 7 (as also shown in FIG. 1) may be snapped on and off in the direction R, it is also possible subsequently to remove the releasing element 31 from the plug part 20 and to replace it by a second releasing element with another coding. Subsequently another coding element 7 may be snapped onto the plug part 1.

Figure 5:
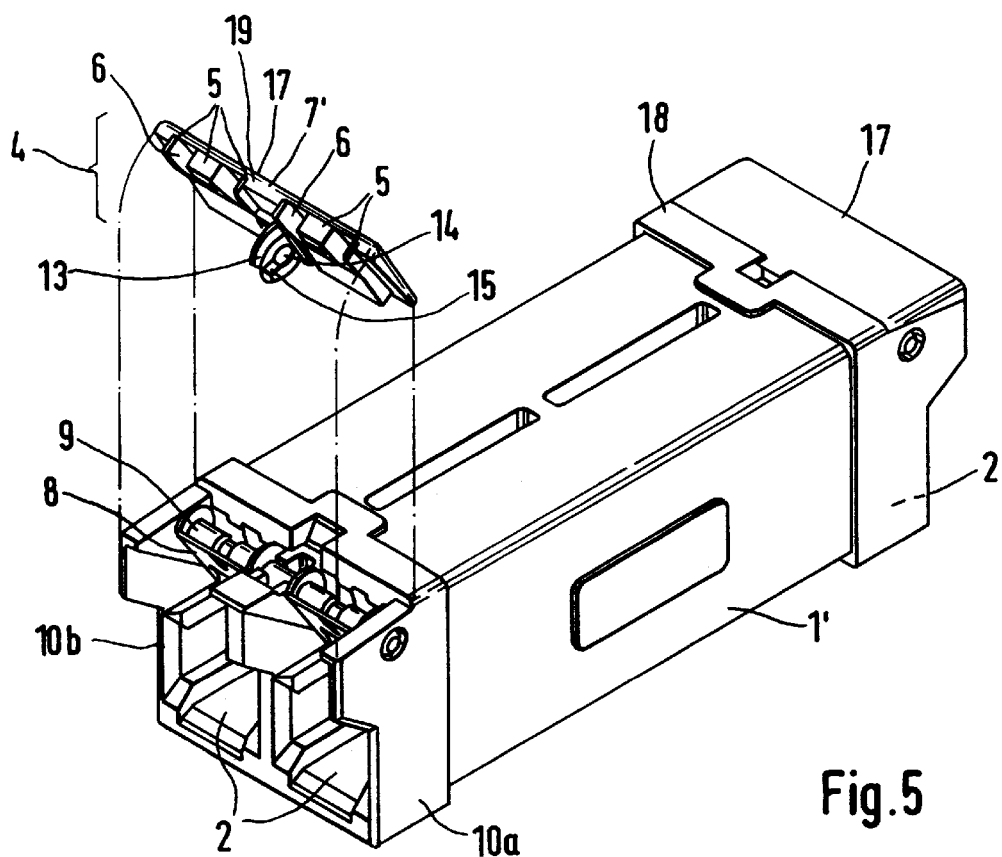
FIG. 5 a perspective representation of a sleeve part of a second embodiment example with a snapped-off coding element, FIG. 6 a perspective representation of a plug connection with a sleeve according to FIG. 5, FIG. 7 a longitudinal section through the sleeve part of FIG. 5, FIG. 8a to 8c detailed views of the coding element of the sleeve part according to FIG. 5.

FIG. 5 shows an alternative embodiment example of a sleeve part 1'. The sleeve part 1' is provided with two openings 2 for receiving two plug parts 20. The sleeve part 1' corresponds essentially to the sleeve part 1 and differs from this in the number of openings 2 and the formation of the coding element, The coding element 7' is formed as a flat platelet. The coding, element 7' is on its underside provided with a projection 13 which comprises an opening 14 with an undercut 15. With the projection 13 the plate-like coding element 7 can be snapped onto the axis 9 which carries the protective flap 8.

In the embodiment example according to FIG. 5 a part of the projections 5 simultaneously serves as an aid for the aligning and the exact positioning of the coding element 7' on the sleeve part 1'. The middle deepening on the coding element 7' serves as an aligning element 19 which fits onto a counter element on the sleeve part 1. The aligning element 19 comprises also two projections 5, which on the one hand permit a lateral positioning of the coding element 7 and which on the other hand however also serve as projections for the codings.

Figure 6:
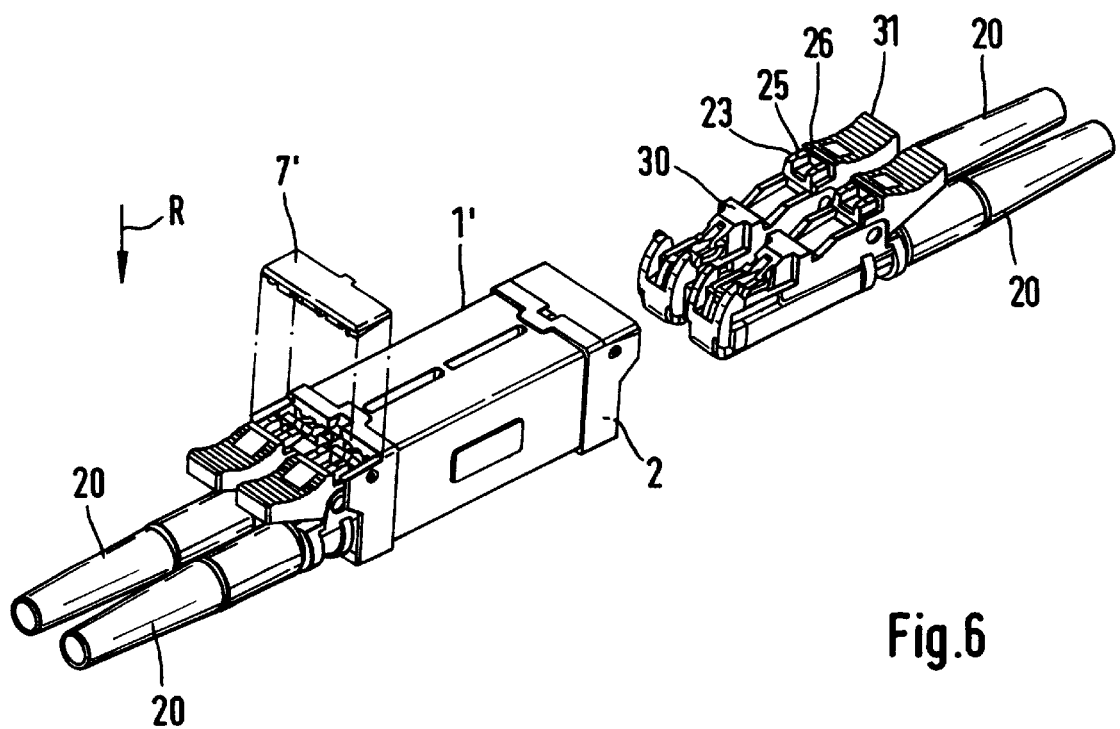

In FIG. 6 there is shown the sleeve part 1' with plug parts 20 inserted on the one side 2 and with plug parts 20 not inserted on the other side.

With such duplex arrangements the application of the U-shaped coding element shown in FIG. 1 would be difficult on account of the large width. The flattish platelet 7 permits a simple insertion from above in the snap-on direction R. Also if several such sleeve parts 1' were arranged next to one another in a tightly packed manner a placing-on of the coding element 7' is possible without problem.

Figure 7:
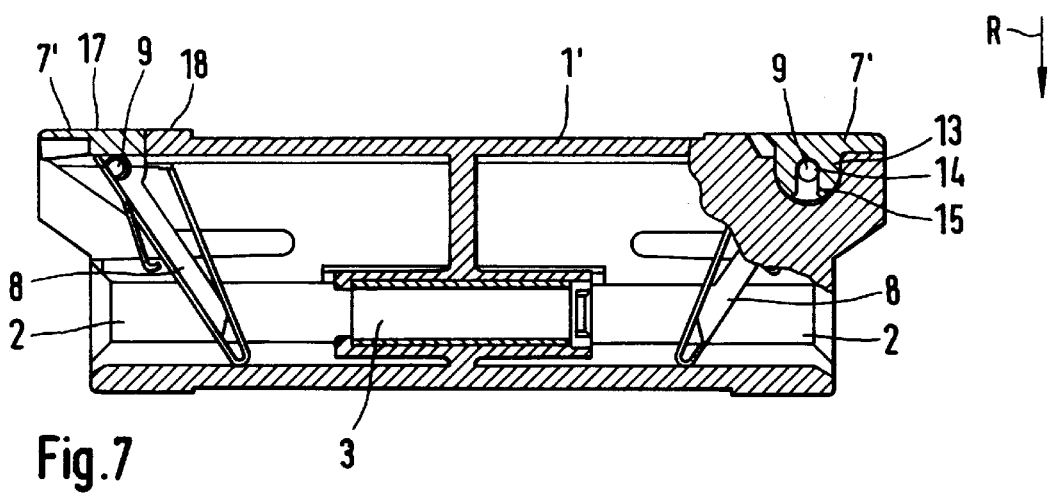

In FIG. 7 a longitudinal section through a sleeve part 1' according to FIG. 5 is shown. With the exception of the formation of the coding element and of the seat for the coding element the view in FIG. 7 also corresponds to a longitudinal section through the sleeve part according to FIGS. 1 to 3. In the inside of the sleeve part 1' there is arranged a sleeve 3 for accommodating a plug pin of the plug part 21. The plug part 21 from both sides is insertable through the openings 2 into the sleeve part 1'. Protective flaps 8 occlude the inside of the sleeve part 1' in a dust-tight manner when the plug part is not inserted.

FIG. 7 shows how the coding element 7' with the projection 13 can be snapped onto the axis 9. Also with an inserted plug part the coding element 7' may be removed without problem in the snap-on direction R.

Figure 8A:
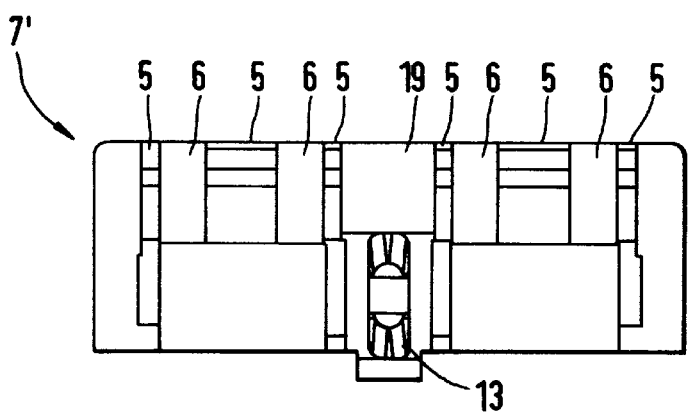

FIG. 8 shows an underview of the coding element 7'. The two middle projections 5 define and enclose an aligning element 19 which permits the exact positioning of the coding element 7' on the sleeve part 1'.

The sequence of projections and reliefs 6 or their respective width and depth code the coding element 7'.

Figure 8C:
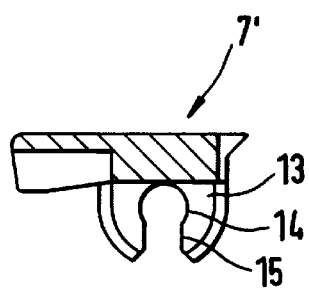
Figure 8B:
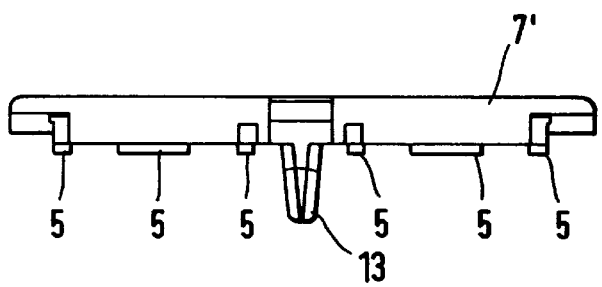

In FIG. 8b a front view of the coding element 7' is shown.

In FIG. 8c there is shown an enlarged representation of the projection 13 by way of which the coding element 7' can be snapped on to the axis 9 on the sleeve part 1'.

The sleeve part as well as also the coding element is manufactured with the injection moulding method from plastic material and thus comprises the deformability required for snapping on. The coding element may be coloured with a differing colour.

What is claimed is:

1. A sleeve part for a plug connection for fibre optics, with at least one opening for accommodating a plug part which along an insertion axis is at least partly insertable into the sleeve part, the sleeve part is comprising a securement section with a coding having projections and/or reliefs and into which a key section of a plug part with a corresponding coding can be brought into engagement, characterised in that the securement section is arranged on at least one separately formed coding element, and that the coding element is adapted to be snapped in a snap-on direction transversely to the insertion axis onto the sleeve part, such that the coding element, given a plug part inserted into the sleeve part, can be snapped onto the sleeve part.

2. A sleeve part according to claim 1, characterised in that the sleeve part is provided with at least one protective flap for closing the opening which is pivotably mounted on an axis in the sleeve part.

3. A sleeve part according to claim 2, characterised in that the coding element is formed as a platelet which, with at least one snap element, preferably with a projection which is provided with a relief with an undercut, can be snapped onto said axis.

4. A sleeve part according to claim 3, characterised in that the sleeve part is formed as a duplex part with two sleeves for accommodating two plug pins lying next to one another and has two protective flaps on the axis which lie next to one another, wherein the snap element is arranged in a middle section on the platelet and is adapted to be snapped between the protective flaps onto the axis.

5. A sleeve part according to claim 1, with two lateral walls, characterised in that the coding element is formed substantially U-shaped, wherein the coding element comprises limbs adapted to be snapped onto the lateral walls.

6. A sleeve part according to claim 5, characterised in that the limbs have outer surfaces in each case lying substantially in the same plane as the lateral walls.

7. A sleeve part according to claim 1, characterised in that the coding element on one side comprises a substantially flat surface which with a snapped-on coding element lies roughly in a same plane as the upper side of the sleeve part.

8. A sleeve part according to claim 1, characterised in that the coding element comprises aligning elements which ensure an exactly defined and positioned snapping-on of the coding element, wherein preferably at least a part of the aligning element simultaneously servos as a projection for the coding of the securing element.

9. A sleeve part according to claim 1, characterised in that the sleeve part is manufactured as one piece, preferably with the injection moulding method and that the coding element is manufactured as one piece, preferably with the injection moulding method.

10. A plug connection for fibre optics with at least one sleeve part according to claim 1 and with at least one plug part which can be inserted into the sleeve part, wherein the plug part comprises a key section with a coding, of reliefs and/or projections, which can be brought into engagement with the securement section on the sleeve part.

11. A plug connection according to claim 10, characterised in that the sleeve part comprises a detent pawl and the plug part a blocking element and a releasing element, wherein the key section is arranged on the releasing element.

12. A plug connection according to claim 11, characterised in that the releasing element is exchangeably held in the plug part.

* * * * *